United States Patent
Zhao et al.

(10) Patent No.: US 9,420,616 B2
(45) Date of Patent: Aug. 16, 2016

(54) METHODS TO ENHANCE VIDEOTELEPHONY TO ACHIEVE LOCAL QOS

(71) Applicant: Qualcomm Incorporated, San Diego, CA (US)

(72) Inventors: Suli Zhao, San Diego, CA (US); Arvind Swaminathan, San Diego, CA (US); Srinivasan Balasubramanian, San Diego, CA (US); Min Wang, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

(21) Appl. No.: 13/779,318

(22) Filed: Feb. 27, 2013

(65) Prior Publication Data

US 2014/0118462 A1   May 1, 2014

Related U.S. Application Data

(60) Provisional application No. 61/719,878, filed on Oct. 29, 2012.

(51) Int. Cl.
*H04W 72/00* (2009.01)
*H04W 76/02* (2009.01)
*H04W 72/04* (2009.01)
(Continued)

(52) U.S. Cl.
CPC ........ *H04W 76/022* (2013.01); *H04W 72/0486* (2013.01); *H04W 72/087* (2013.01); *H04W 76/041* (2013.01)

(58) Field of Classification Search
CPC ..... H04W 24/00; H04W 28/04; H04W 28/18; H04W 28/24; H04W 72/085; H04W 76/041; H04W 72/0486; H04W 72/087; H04W 76/02; H04W 76/022; H04W 4/10; H04W 76/005; H04W 76/046; H04L 65/80; H04L 65/1069
USPC ........... 455/452.2, 450, 452.1, 445, 455, 453; 370/329, 401, 338, 331, 347, 315
See application file for complete search history.

(56) References Cited

U.S. PATENT DOCUMENTS 6,421,374 B2   7/2002   Blakeney, II et al.
6,839,356 B2 *   1/2005   Barany ................ H04M 7/0009
                                                                370/352

(Continued)

OTHER PUBLICATIONS

European Search Report—EP15177323—Search Authority—Munich—Oct. 15, 2015.

*Primary Examiner* — Mahendra Patel

(57) ABSTRACT

A method, an apparatus, and a computer program product for wireless communication at a first user equipment (UE) are provided. The apparatus sends a request to a second UE for establishing a call connection, receives from the second UE an acknowledgment for establishing the call connection, establishes at least one first dedicated bearer between the first UE and a network for communicating media packets with the second UE, sends first dummy data to the second UE via the established at least one first dedicated bearer, receives at least one of second dummy data or a media packet from the second UE via the established at least one first dedicated bearer, and exchanges media packets with the second UE via the established at least one first dedicated bearer after receiving the at least one of the second dummy data or the media packet from the second UE.

33 Claims, 12 Drawing Sheets

(51) Int. Cl.
*H04W 72/08* (2009.01)
*H04W 76/04* (2009.01)

(56) References Cited

U.S. PATENT DOCUMENTS

| | | | |
|---|---|---|---|
| 7,907,529 B2 | 3/2011 | Wisely et al. | |
| 2005/0141471 A1* | 6/2005 | Virtanen | H04L 45/00 370/342 |
| 2006/0023657 A1* | 2/2006 | Woodson | H04W 8/18 370/328 |
| 2007/0118659 A1 | 5/2007 | Cuny et al. | |
| 2008/0170563 A1* | 7/2008 | Zhu | H04L 29/06027 370/352 |
| 2008/0248792 A1* | 10/2008 | Gundu | H04W 72/005 455/422.1 |
| 2009/0185527 A1 | 7/2009 | Akhtar et al. | |
| 2009/0257378 A1* | 10/2009 | Cuny | H04W 76/02 370/328 |
| 2009/0290576 A1* | 11/2009 | Long | H04L 12/66 370/352 |
| 2010/0299338 A1* | 11/2010 | Aarni | H04W 8/22 707/759 |
| 2010/0316066 A1* | 12/2010 | Leung | H04N 21/44209 370/468 |
| 2011/0194437 A1* | 8/2011 | Song | H04W 76/02 370/252 |
| 2012/0033626 A1* | 2/2012 | Dwyer | H04W 76/046 370/329 |
| 2012/0087245 A1 | 4/2012 | Leung | |

\* cited by examiner

METHODS TO ENHANCE VIDEOTELEPHONY TO ACHIEVE LOCAL QOS

CROSS-REFERENCE TO RELATED APPLICATION(S)

This application claims the benefit of U.S. Provisional Application Ser. No. 61/719,878, entitled "METHODS TO ENHANCE VIDEOTELEPHONY TO ACHIEVE LOCAL QOS" and filed on Oct. 29, 2012, which is expressly incorporated by reference herein in its entirety.

BACKGROUND

1. Field

The present disclosure relates generally to communication systems, and more particularly, to enhancing videotelephony to achieve a local quality of service (QoS) flow.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for wireless communication at a first user equipment (UE) are provided. The apparatus sends/receives a request to/from a second UE for establishing a call connection, receives/sends from/to the second UE an acknowledgment for establishing the call connection, establishes at least one first dedicated bearer between the first UE and a network for communicating media packets with the second UE, sends first dummy data to the second UE via the established at least one first dedicated bearer, receives at least one of second dummy data or a media packet from the second UE via the established at least one first dedicated bearer, and exchanges media packets with the second UE via the established at least one first dedicated bearer after receiving the at least one of the second dummy data or the media packet from the second UE.

In a further aspect of the disclosure, the apparatus sends a request to a second UE for establishing a call connection, receives from the second UE an acknowledgment for establishing the call connection, establishes a dedicated bearer between the first UE and a first base station for the call connection with the second UE, the establishing the dedicated bearer comprising receiving at least a maximum bit rate (MBR) and a guaranteed bit rate (GBR) for the call connection, the first base station capable of supporting the MBR, receives an indication that congestion is experienced the first base station, or experienced at a second base station if a handover is performed from the first base station to the second base station, and sends a temporary maximum media bit rate request (TMMBR) to the second UE for lowering a bit rate for the call connection to the GBR.

In yet another aspect of the disclosure, the apparatus sends a request to a second UE for establishing a call connection, receives from the second UE an acknowledgment for establishing the call connection, establishes a dedicated bearer between the first UE and a base station for the call connection with the second UE, the establishing the dedicated bearer comprising receiving at least a maximum bit rate (MBR) and a guaranteed bit rate (GBR) for the call connection, receives from the base station a new MBR after the dedicated bearer has been modified, the new MBR less than a current bit rate for the call connection, sends a temporary maximum media bit rate request (TMMBR) to the second UE for lowering a bit rate to continue the call connection according to the new MBR, and wherein if the new MBR is different from a current MBR, sends a request to the second UE to re-negotiate the call connection by providing a new data bandwidth.

DETAILED DESCRIPTION

Figure 1:
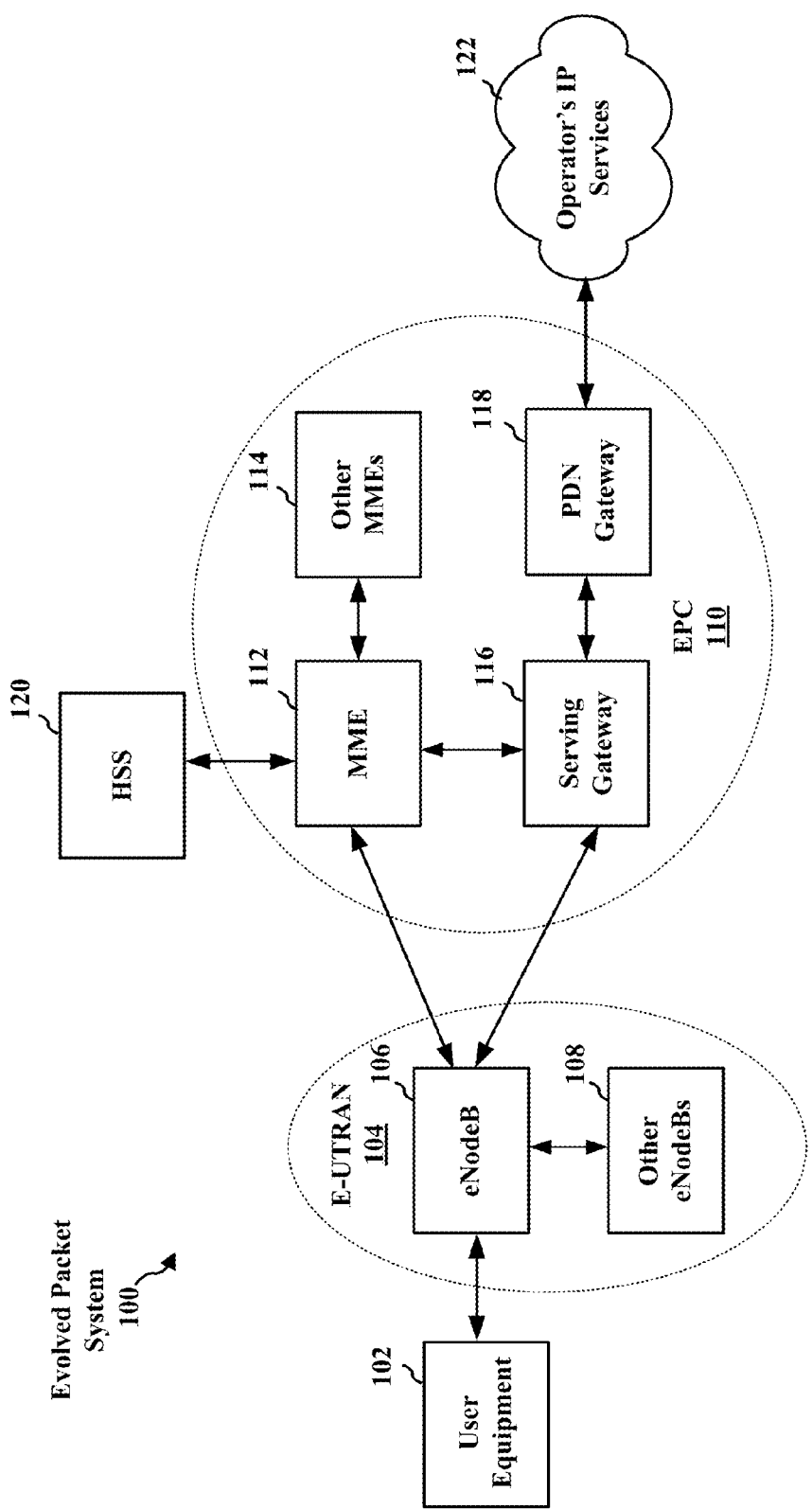
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
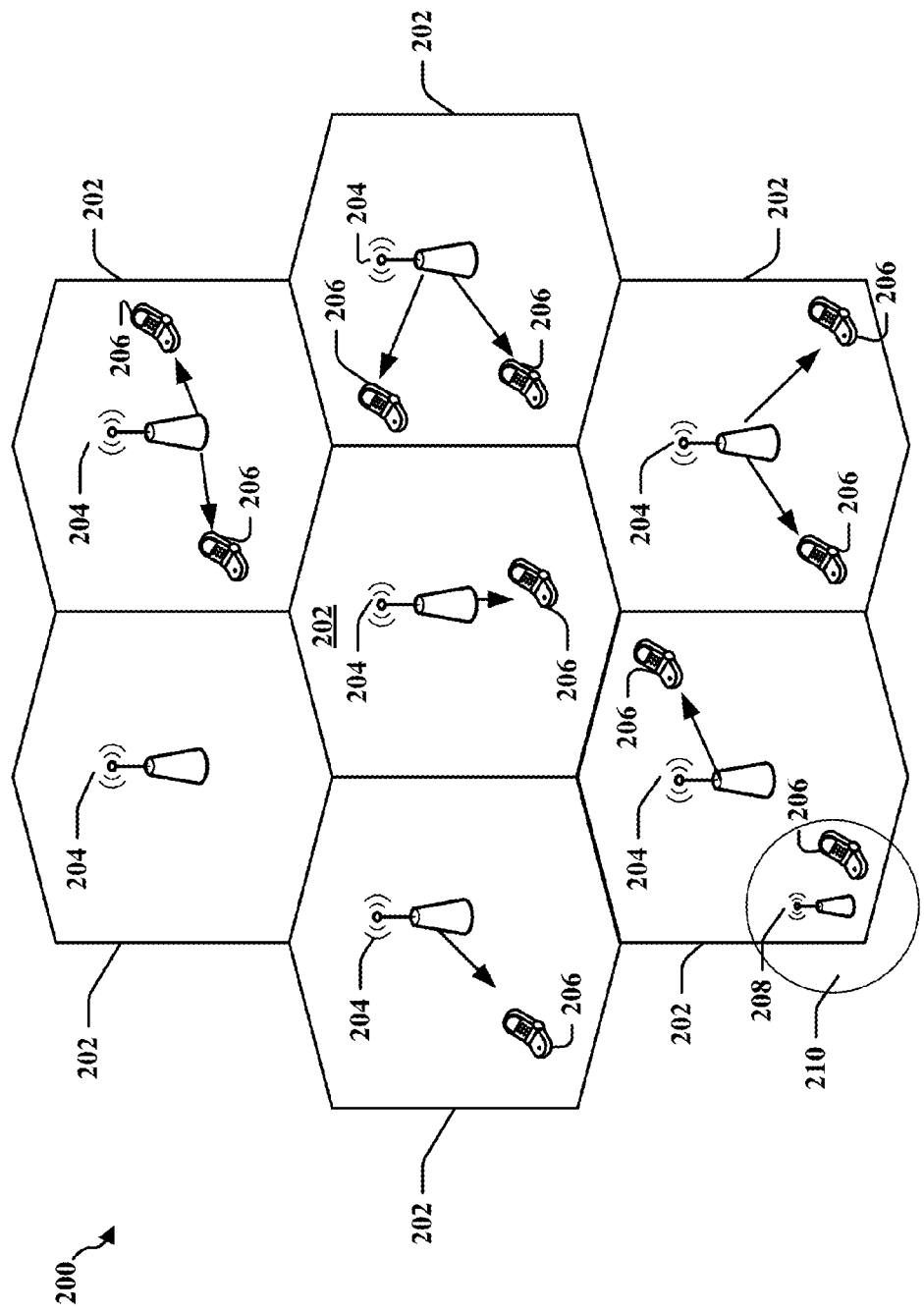
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 3:
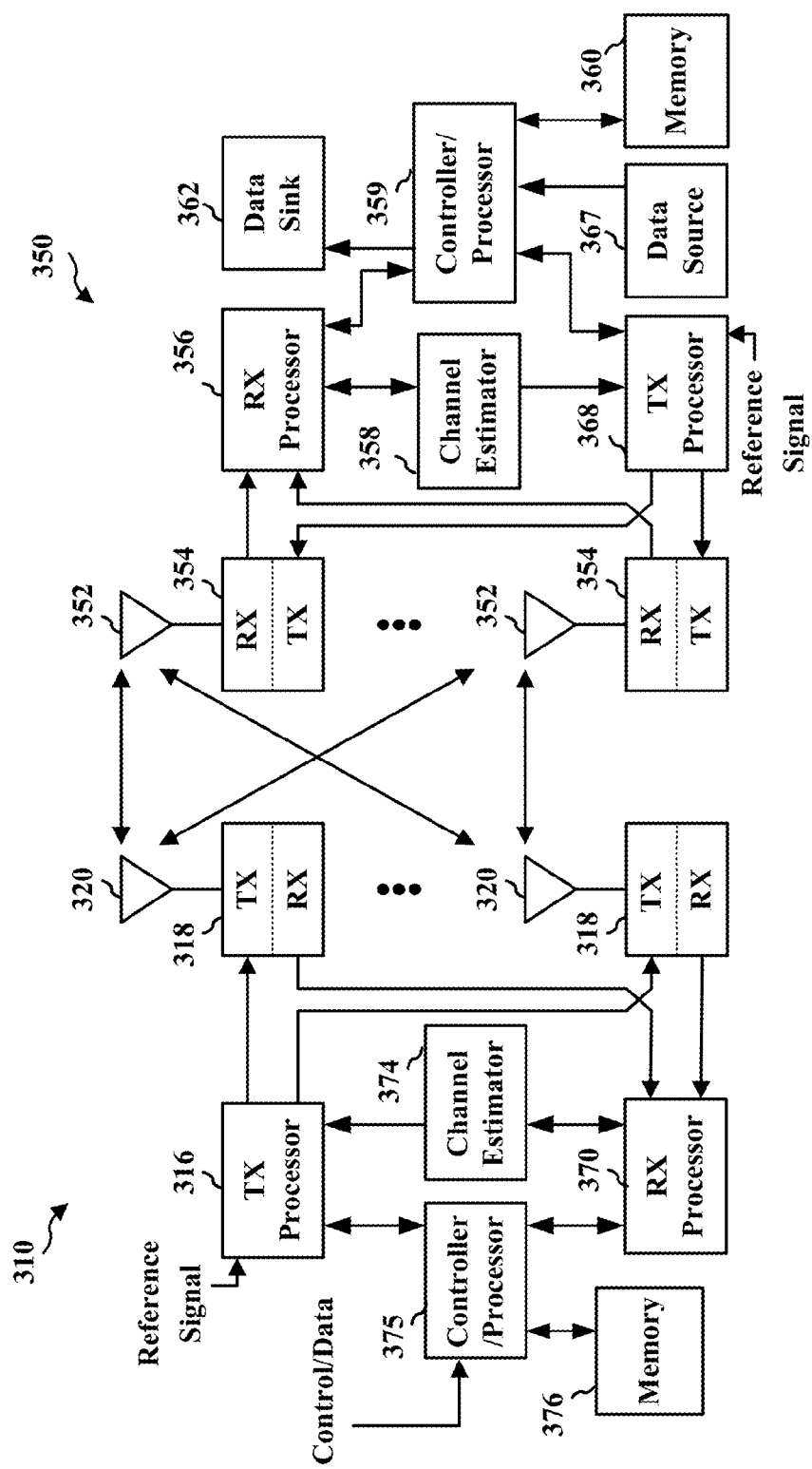
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

In an aspect, the present disclosure relates to IMS videotelephony, particularly for a scenario where setting up a local quality of service (QoS) flow is required but session initiation protocol (SIP) preconditions are not used. A mechanism for using SIP preconditions may be a way of ensuring that a required resource/QoS is reserved before an SIP session is established. However, system operators may choose not to use SIP preconditions while requiring media over QoS flows. This approach causes certain problems. As such, the present disclosure resolves these problems.

In an aspect, a local QoS flow requirement and a preconditions mechanism may be turned on and off separately. It is possible to support a local QoS requirement without preconditions.

If a local resource reservation is required, a videotelephony (VT) application may register QoS notification callbacks (for audio and video separately) using requested packet filters with a mobile subscriber software (e.g., Advanced Mobile Subscriber Software (AMSS)), at a time when the VT application receives/sends a session description protocol (SDP) answer corresponding to an initial SDP offer. When registering the QoS notification callbacks with the mobile subscriber software, the VT application may start a timer (e.g., a WaitForQoS timer). If the timer expires while waiting for a QoS Activate notification from the mobile subscriber software, the VT application may consider the resource reservation for the corresponding media to have failed.

Figure 4:
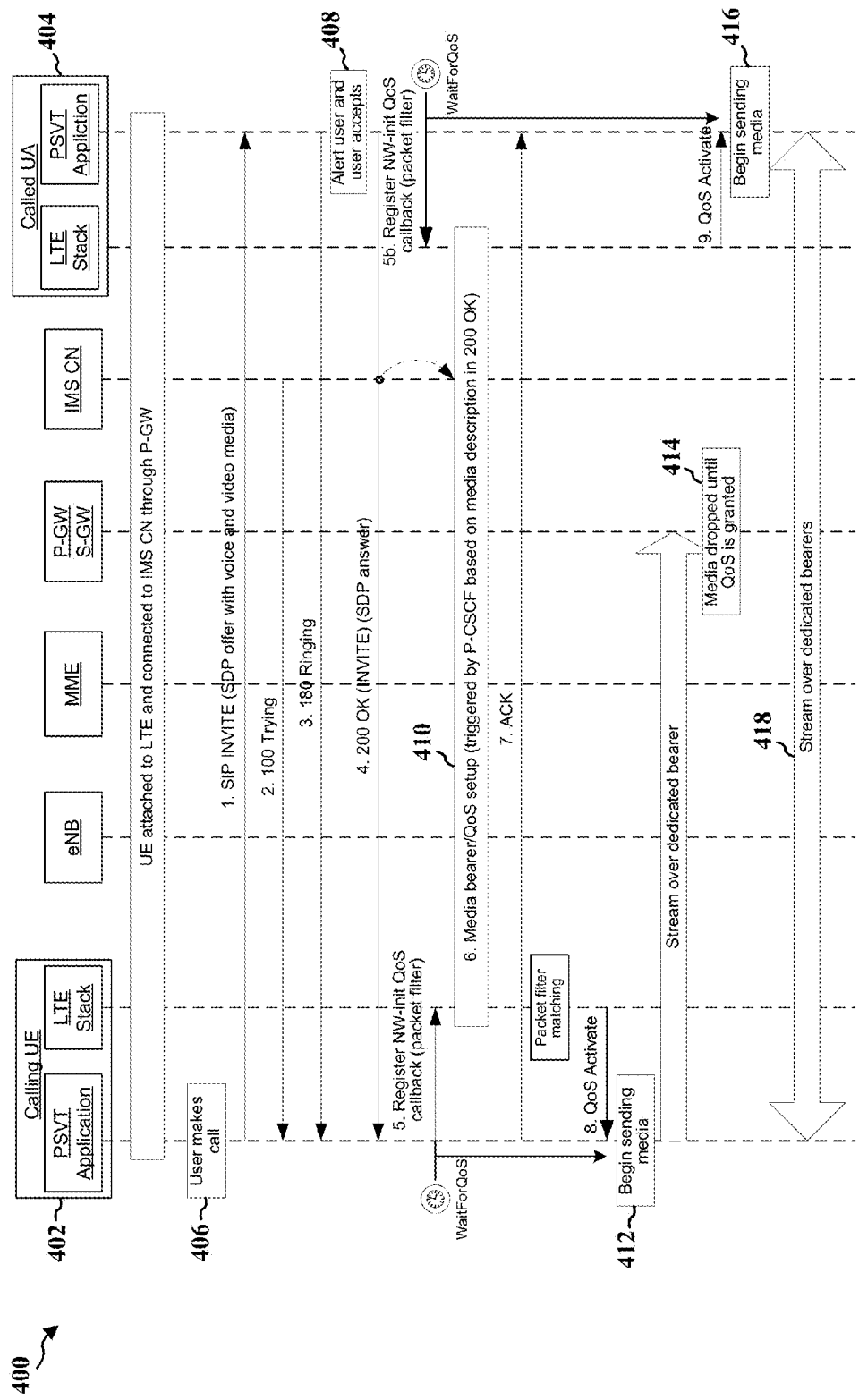
FIG. 4 is a diagram illustrating a videotelephony call setup between an originating UE and a terminating UE.

FIG. 4 is a diagram 400 illustrating a videotelephony call setup between an originating UE 402 and a terminating UE 404. At 406, a user of the originating UE 402 may initiate a call connection with the terminating UE 404 by sending an SIP invite to the terminating UE 404. The SIP invite may include an SDP offer with voice and video media. At 408, a user of the terminating UE 404 may accept the call connection and send an SDP answer to the originating UE 402.

Subsequently, the originating UE 402 and the terminating UE 404 may each register QoS notification callbacks (for audio and video separately) using requested packet filters and start a WaitForQoS timer. At 410, at least one dedicated bearer between the originating UE 402 and a network for communicating media packets with the terminating UE 404 is setup. Similarly, at least one dedicated bearer between the terminating UE 404 and the network for communicating media packets with the originating UE 402 is setup. Audio packets may require a separate dedicated bearer from video packets. The setup of the at least one dedicated bearer may include setting up a QoS flow with QoS parameters comprising at least a maximum bit rate (MBR) and a guaranteed bit rate (GBR).

At 412, after a VT application at the originating UE 402 learns that the at least one dedicated bearer between the originating UE 402 and the network is established (e.g., local QoS flow is granted via a QoS Activate notification), the VT application at the originating UE 402 may consider the call connection established and begins sending media packets to the terminating UE 404 via the at least one dedicated bearer. Similarly, at 416, after a VT application at the terminating UE 404 learns that the at least one dedicated bearer between the terminating UE 404 and the network is established (e.g., local QoS flow is granted via a QoS Activate notification), the VT application at the terminating UE 404 may consider the call connection established and begins sending media packets to the originating UE 402 via the at least one dedicated bearer. At 418, media packets are exchanged between the originating UE 402 and the terminating UE 404 via the established dedicated bearers.

Still referring to FIG. 4, it is noted that the dedicated bearer between the originating UE 402 and the network is established well before the dedicated bearer between the terminating UE 404 and the network is established. Thus, at 414, when the originating UE 402 begins sending media packets to the terminating UE 404 via the established dedicated bearer, the packets will be dropped by the serving gateway (S-GW) and/or PDN gateway (P-GW) because the dedicated bearer between the terminating UE 404 and network has yet to be established. Once the dedicated bearer between the terminating UE 404 and network is established, the S-GW and/or P-GW stops dropping the packets sent from the originating UE 402.

The videotelephony call setup of FIG. 4 may lead to a number of issues. For example, one issue relates to media clipping. In media clipping, a call has been set up (e.g., UE may show "call connected"), but media cannot flow (e.g., a user cannot get service) until a QoS flow is granted. Local QoS flows at two ends (e.g., originating UE and terminating UE) may be granted at different times. Accordingly, video clipping may occur if one end has begun generating media but the media is being dropped at the other end until a QoS flow at the other end is granted, particularly if I-frames are dropped.

Another issue relates to SPS/PPS missing. SPS/PPS are parameters required to negotiate a screen resolution between two parties. There may be times when the SPS/PPS parameters are required to be sent in-band via SIP signaling based on far-end (e.g., terminating UE) support for the SPS/PPS parameters. For example, an SIP negotiation may result in changes in resolution/cbp level that requires the SPS/PPS parameters to be sent in-band. If the far-end drops all packets until a local QoS flow is granted, the SPS/PPS parameters may also be lost.

A further issue relates to a downgrade/upgrade of video QoS. A VT call may be downgraded to a voice-only call if a network cannot provide the required rate for video. This may be due to RAN temporary congestion or a different load of a target eNB during inter-eNB handover. The VT call should be maintained when the rate for video provided by the network has changed. Additionally, if the network decides to lower a maximum bit rate (MBR) based on metrics, such as feedback from an eNB, UE subscription, etc., the network may send a Modify EPS Bearer Request to a UE. The VT call should be maintained when the QoS has changed.

Another issue relates to an RTP control protocol (RTCP). The RTCP contains audio/video synchronization information. If all packets are dropped until a local QoS flow is granted, then the RTCP may also be lost. As such, the lost RTCP may cause audio and video packets to be unsynchronized. Therefore, a mechanism for setting up the VT call wherein media packets are not dropped should be provided.

Figure 5:
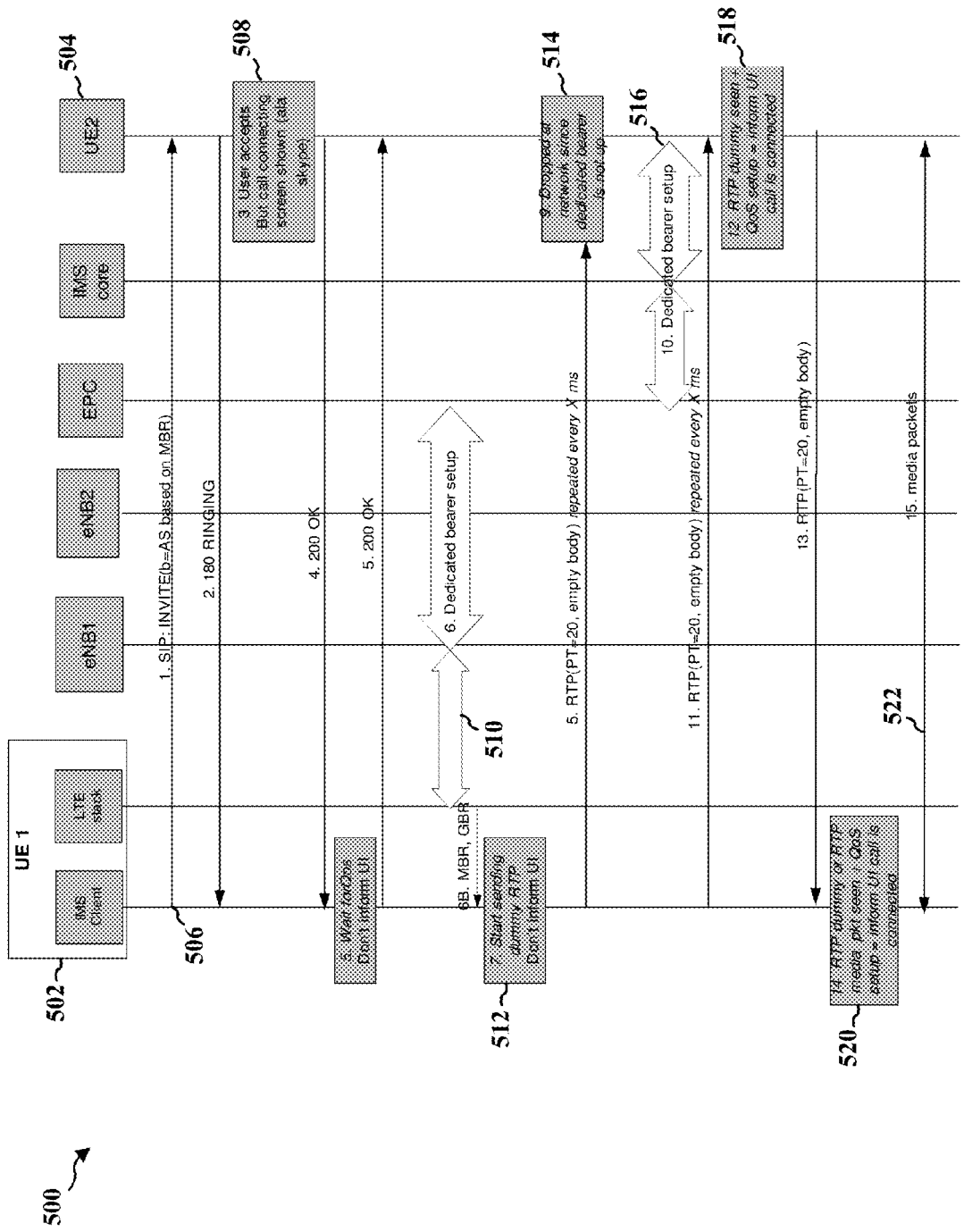
FIG. 5 is a diagram illustrating a videotelephony call setup between an originating UE and a terminating UE.

FIG. 5 is a diagram 500 illustrating a videotelephony call setup between an originating UE 502 and a terminating UE 504. At 506, a user of the originating UE 502 may initiate a call connection with the terminating UE 504 by sending an SIP invite to the terminating UE 504. At 508, a user of the terminating UE 504 may accept the call connection and sends a response to the originating UE 502. Notably, after accepting the call connection, the terminating UE 504 does not inform a user interface (UI) at the terminating UE 504 that the call is connected. Rather, the terminating UE 504 may inform the UI that the call connection is in progress. Similarly, originating UE does inform the UE at the originating UE that the call is connected, but may inform the UI that the call connection is in progress. In an aspect, the VT application at each of the UEs 502, 504 considers the call to be connected when a dedicated bearer/local QoS is setup and a respective UE receives an RTP dummy packet or media packet from its counterpart UE.

At 510, at least one dedicated bearer/local QoS flow between the originating UE 502 and a network for communicating media packets with the terminating UE 504 is setup. At 512, the originating UE 502 sends an RTP dummy packet (PT=20) to the terminating UE 504 after the local QoS flow is established. The originating UE 502 repeatedly sends the RTP dummy packet to the terminating UE 504 until the originating UE 502 receives an RTP dummy packet and/or media packet from the terminating UE 504. At 514, the network drops the RTP dummy packet from the originating UE 502 until at least one dedicated bearer/local QoS flow between the terminating UE 504 and the network is setup (see 516).

At 518, after the terminating UE 504 receives the RTP dummy packet from the originating UE 502 and the local QoS flow is established, the VT application at the terminating UE 504 considers the call to be connected and informs the UI of the call connection. The terminating UE 504 may then send an RTP dummy packet or media packet to the originating UE 502. At 520, after the originating UE 502 receives the RTP dummy packet or media packet from the terminating UE 504 and the local QoS flow is established, the VT application at the originating UE 502 considers the call to be connected and informs the UI of the call connection. Thereafter, at 522, media packets are exchanged between the originating UE 502 and the terminating UE 504 via the established dedicated bearers.

Figure 6:
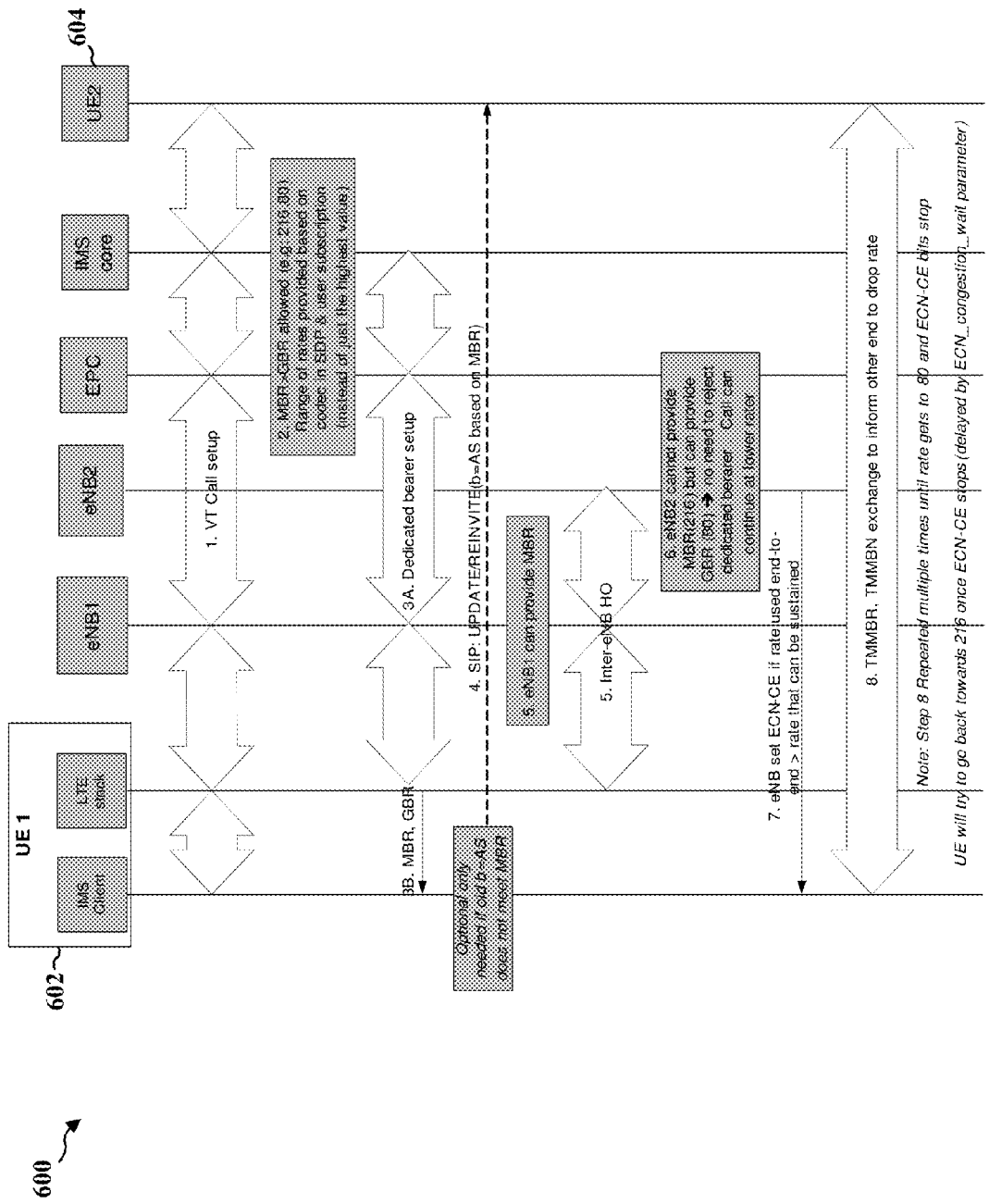
FIG. 6 is a diagram illustrating a videotelephony call setup between an originating UE and a terminating UE.

FIG. 6 is a diagram 600 illustrating a videotelephony call setup between an originating UE 602 and a terminating UE 604. Referring to FIG. 6, LTE Release 10 allows a maximum bit rate (MBR) to be greater than a guaranteed bit rate (GBR). Thus, a network does not need to pick the highest rate allowed by codec in an SDP and UE subscription. The network may provide a range. Hence, when an eNB experiences congestion, or after eNB handover, a call may continue over a wider range of scenarios, as long as the eNB serving the UE (e.g., originating UE 602) supports the GBR. The eNB serving the originating UE 602 may use ECN-CE bits to indicate to the UE that a current rate cannot be sustained. The originating UE 602 may react by sending a temporary maximum media bit rate request (TMMBR) to a sender (e.g., terminating UE 604) to ask the sender to reduce a rate. The originating UE 602 may send a temporary maximum media bit rate request (TMMBR) to a sender (e.g., terminating UE 604) to ask the sender to reduce a rate until the rate reaches the GBR and the eNB serving the originating UE 602 stops sending the ECN-CE bits.

After a configurable period of time from when the eNB serving the originating UE 602 stops sending the ECN-CE bits, the originating UE 602 may send a temporary maximum media bit rate request to a sender (e.g., terminating UE 604) to increase a rate to the MBR.

Figure 7:
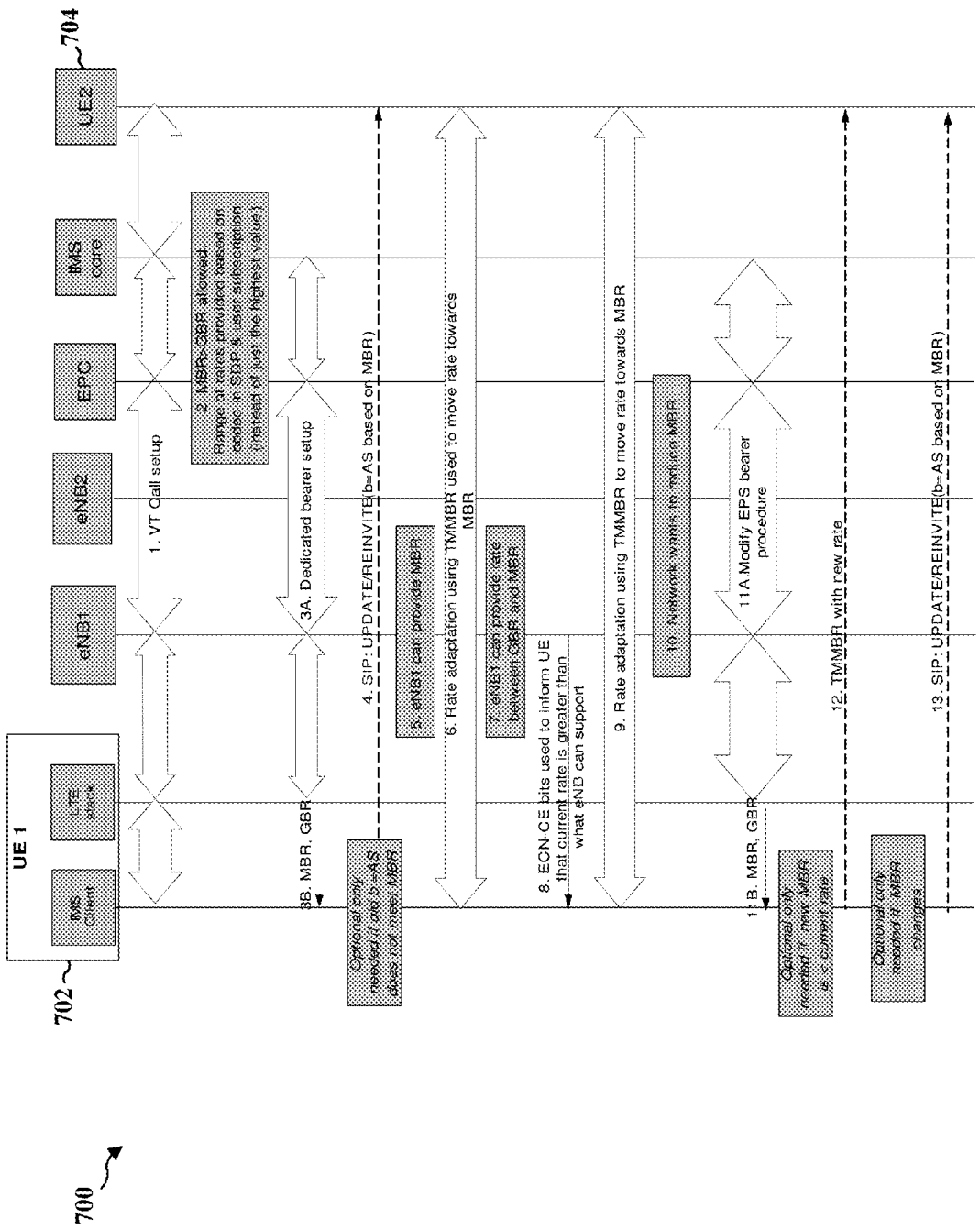
FIG. 7 is a diagram illustrating a videotelephony call setup between an originating UE and a terminating UE.

FIG. 7 is a diagram 700 illustrating a videotelephony call setup between an originating UE 702 and a terminating UE 704. Referring to FIG. 7, if a network decides to lower the MBR based on metrics, such as feedback from an eNB, UE subscription, etc., the network may send a Modify EPS Bearer Request to the UE. Upon receiving a MBR smaller than a current rate, the UE (e.g., originating UE 702) will send a TMMBR to a far-end (e.g., terminating UE 704) to immediately reduce a rate. If the MBR is different from an older MBR, the UE (e.g., originating UE 702) will send to the far-end (e.g., terminating UE 704) a request to re-negotiate a call connection by providing a new data bandwidth (e.g., SIP: UPDATE/REINVITE with new b=AS).

Figure 8:
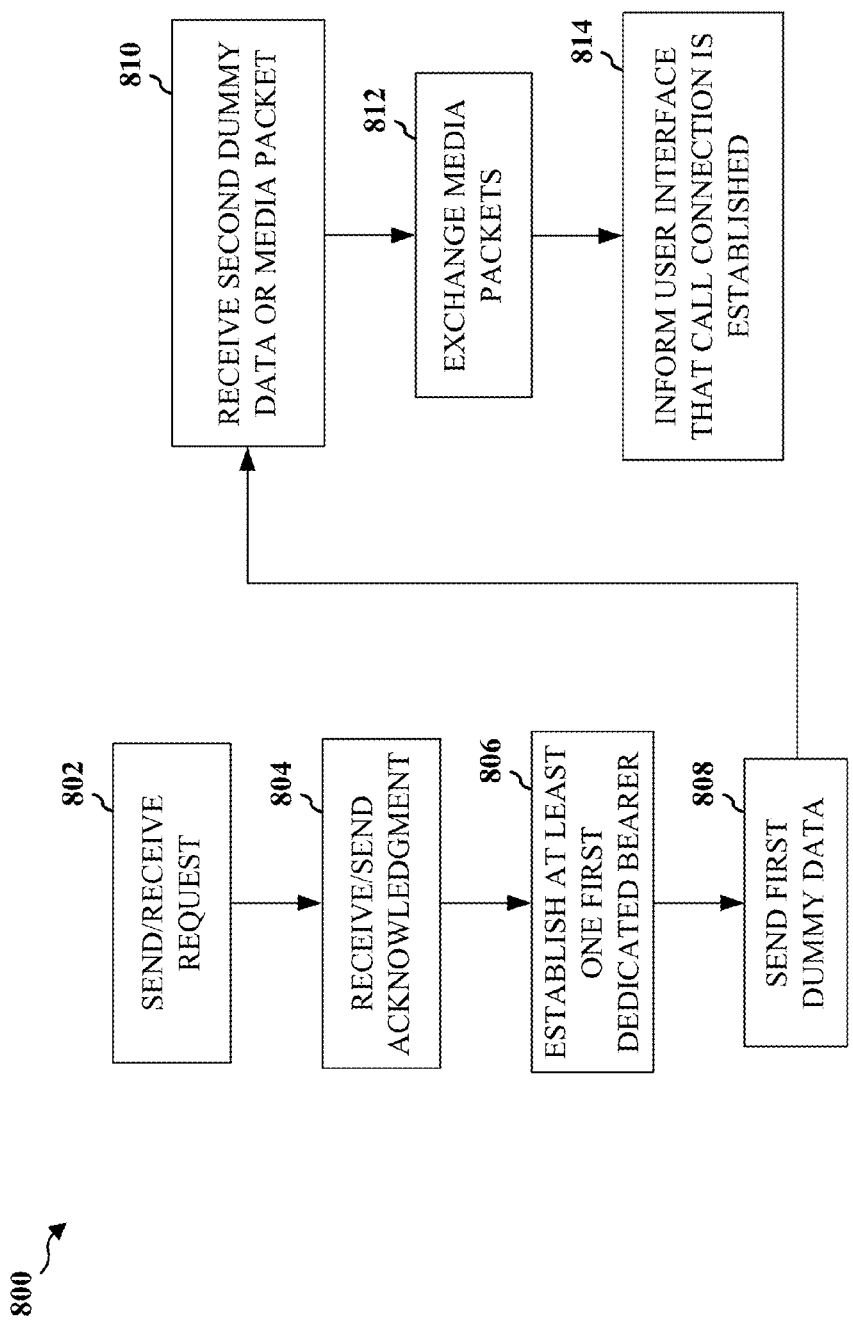
FIG. 8 is a flow chart of a method of wireless communication.

FIG. 8 is a flow chart 800 of a method of wireless communication. The method may be performed by a first UE (e.g., originating UE or terminating UE). At step 802, if the first UE is the originating UE, the first UE may send a request to a second UE for establishing a call connection. If the first UE is the terminating UE, the first UE may receive a request from the second UE for establishing the call connection.

At step 804, if the first UE is the originating UE, the first UE may receive from the second UE an acknowledgment for establishing the call connection. If the first UE is the terminating UE, the first UE may send an acknowledgment to the second UE for establishing the call connection.

At step 806, the first UE establishes at least one first dedicated bearer between the first UE and a network for communicating media packets with the second UE. Establishing the first dedicated bearer comprises setting up a quality of service (QoS) flow with QoS parameters comprising a maximum bit rate (MBR) and a guaranteed bit rate (GBR). The media packets may be exchanged between the first UE and the second UE via the QoS flow.

At step 808, the first UE sends first dummy data to the second UE via the established at least one first dedicated bearer. The first dummy data may be periodically sent to the second UE until at least one of second dummy data or a media packet is received from the second UE. The sending the first dummy data to the second UE indicates to the second UE that the at least one first dedicated bearer is established between the first UE and the network for communicating media packets with the second UE.

At step 810, the first UE receives the at least one of the second dummy data or the media packet from the second UE via the established at least one first dedicated bearer. Here, receiving the at least one of the second dummy data or the media packet from the second UE indicates that at least one second dedicated bearer is established between the second UE and the network for communicating media packets with the first UE. Moreover, the establishment of the at least one second dedicated bearer indicates that a quality of service (QoS) flow with QoS parameters comprising at least a maximum bit rate (MBR) and a guaranteed bit rate (GBR) is set up at the second UE.

At step 812, the first UE exchanges media packets with the second UE via the established at least one first dedicated bearer after receiving the at least one of the second dummy data or the media packet from the second UE. At step 814, the first UE informs a user interface at the first UE that the call connection is established after the at least one first dedicated bearer is established and the at least one of the second dummy data or the media packet from the second UE is received.

Figure 9:
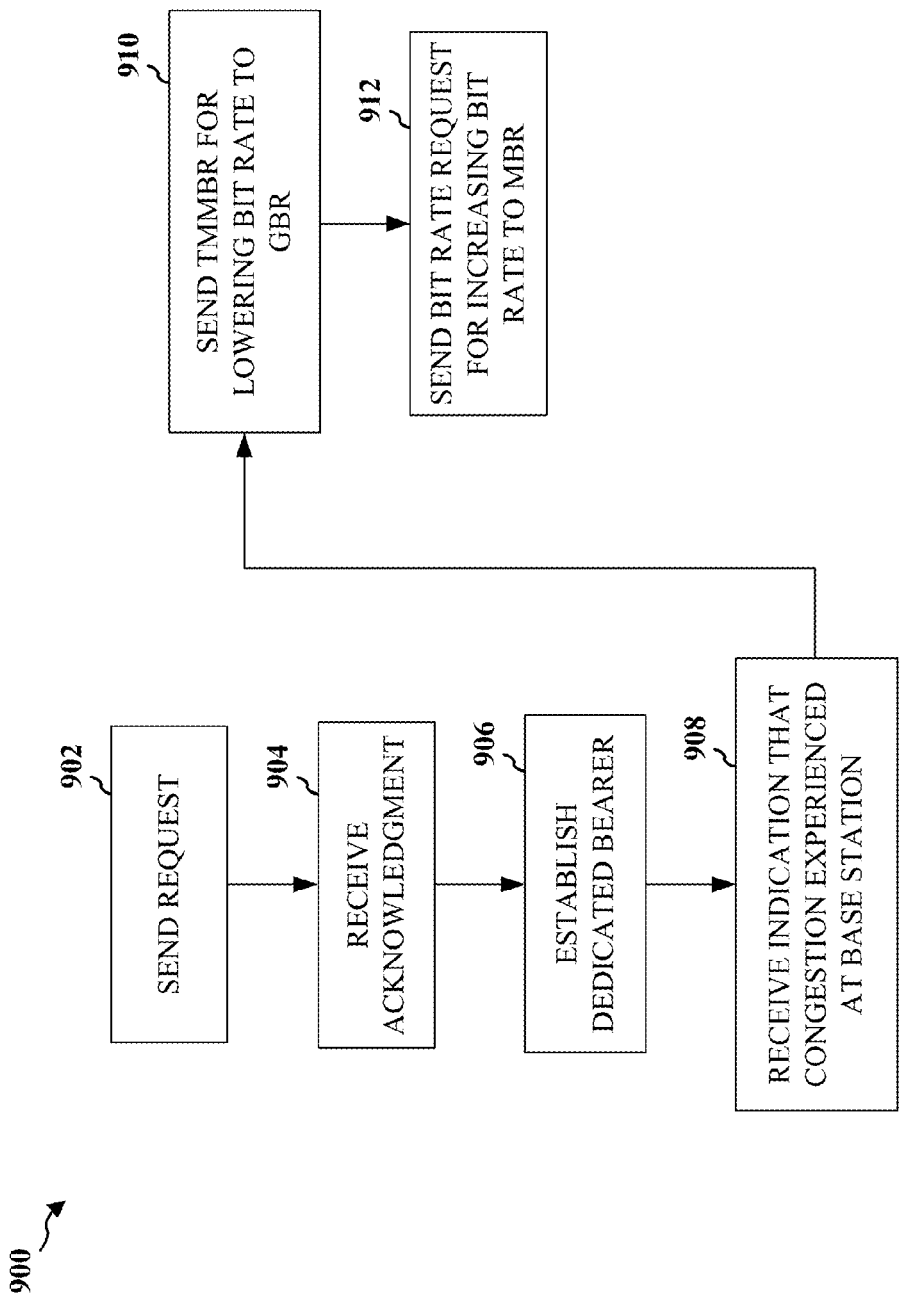
FIG. 9 is a flow chart of a method of wireless communication.

FIG. 9 is a flow chart 900 of a method of wireless communication. The method may be performed by a first UE. At step 902, the first UE sends a request to a second UE for establishing a call connection. At step 904, the first UE receives from the second UE an acknowledgment for establishing the call connection.

At step 906, the first UE establishes a dedicated bearer between the first UE and a first base station for the call connection with the second UE. Establishing the dedicated bearer includes receiving a maximum bit rate (MBR) and a guaranteed bit rate (GBR) for the call connection, wherein the first base station is capable of supporting the MBR.

At step 908, the first UE receives an indication that congestion is experienced either at the first base station or a second base station if a handover is performed from the first base station to the second base station. At step 910, the first UE sends a temporary maximum media bit rate request (TMMBR) to the second UE for lowering a bit rate for the call connection to the GBR. The TMMBR may be repeatedly sent to the second UE until the second UE lowers the bit rate to the GBR and the first base station or second base station stops sending the indication that congestion is experienced.

At step 912, after a configurable period of time from when the first base station or second base station stops sending the indication that congestion is experienced, the first UE sends a bit rate request to the second UE for increasing the bit rate for the call connection to the MBR.

Figure 10:
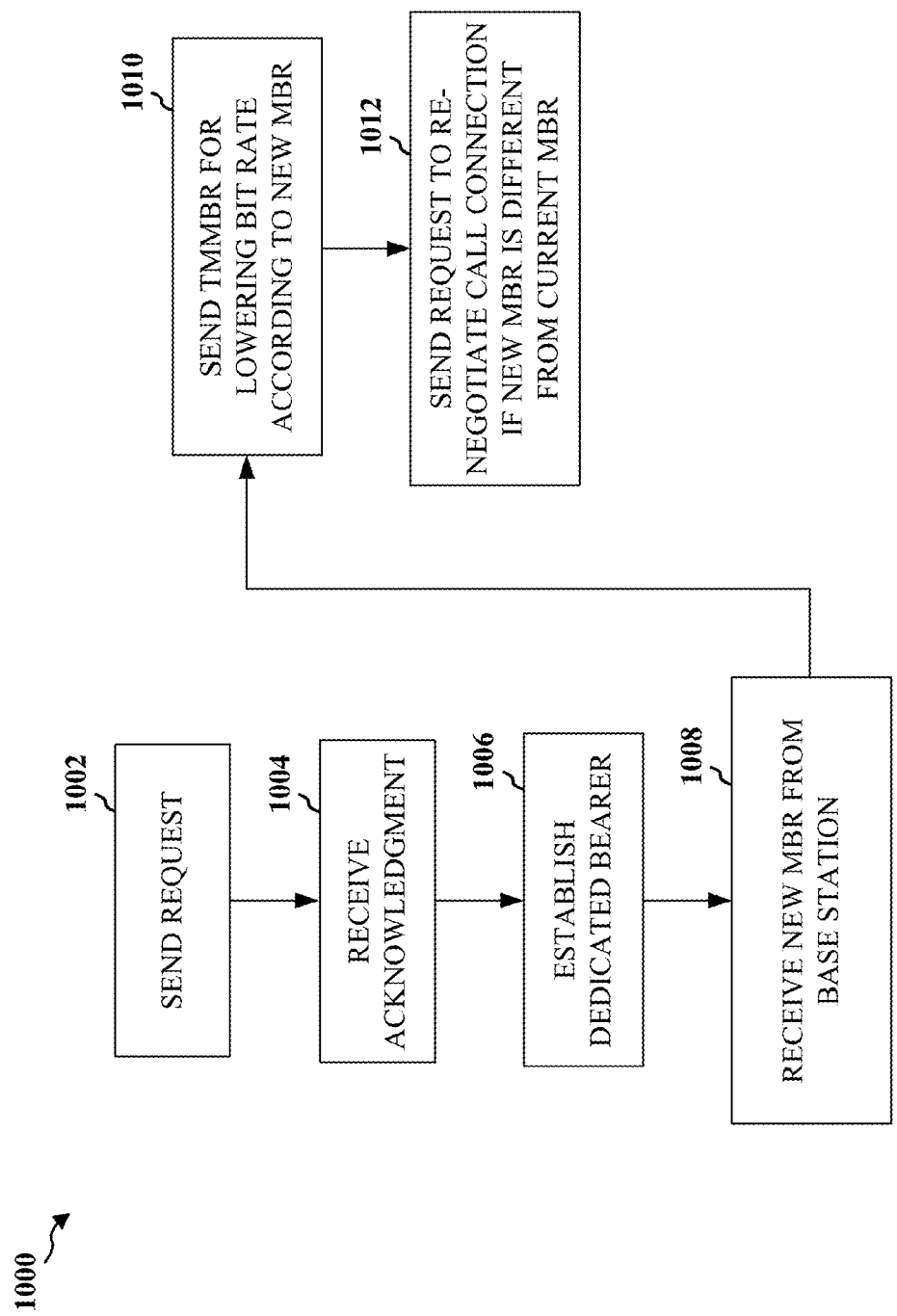
FIG. 10 is a flow chart of a method of wireless communication.

FIG. 10 is a flow chart 1000 of a method of wireless communication. The method may be performed by a first UE. At step 1002, the first UE sends a request to a second UE for establishing a call connection. At step 1004, the first UE receives from the second UE an acknowledgment for establishing the call connection.

At step 1006, the first UE establishes a dedicated bearer between the first UE and a base station for the call connection with the second UE. Establishing the dedicated bearer includes receiving a maximum bit rate (MBR) and a guaranteed bit rate (GBR) for the call connection.

At step 1008, the first UE receives from the base station a new MBR after the dedicated bearer has been modified. The new MBR is less than a current bit rate for the call connection. At 1010, the first UE sends a temporary maximum media bit rate request (TMMBR) to the second UE for lowering a bit rate to continue the call connection according to the new MBR. At step 1012, if the new MBR is different from a current MBR, the first UE sends a request to the second UE to re-negotiate the call connection by providing a new data bandwidth.

Figure 11:
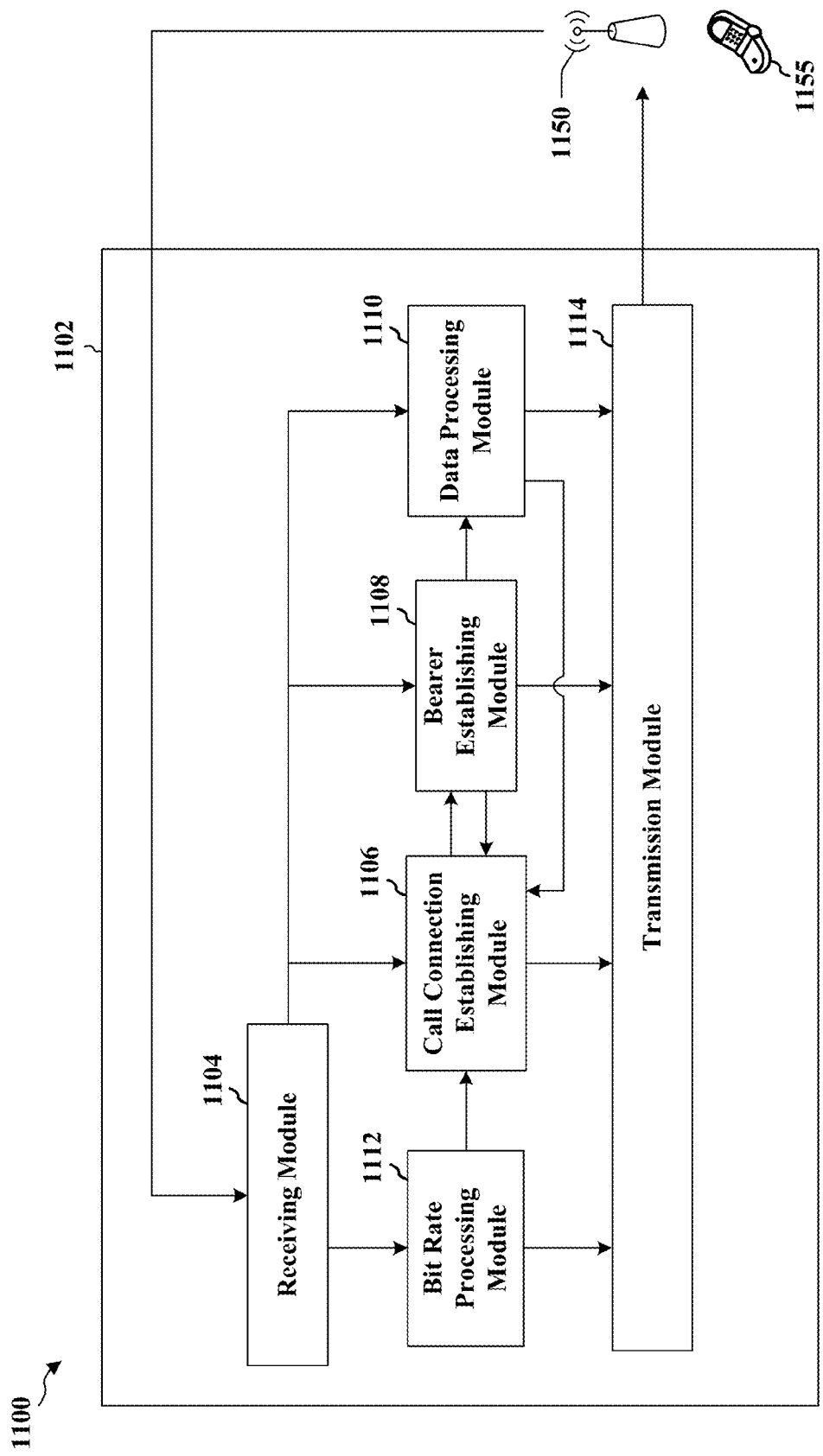
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a first UE. The apparatus includes a receiving module 1104, a call connection establishing module 1106, a bearer establishing module 1108, a data processing module 1110, a bit rate processing module 1112, and a transmission module 1114.

In an aspect, if the first UE 1102 is the originating UE, the call connection establishing module 1106 may send a request to a second UE 1155 for establishing a call connection. If the first UE 1102 is the terminating UE, the call connection establishing module 1106 may receive a request from the second UE 1155 for establishing the call connection.

If the first UE 1102 is the originating UE, the call connection establishing module 1106 may receive from the second UE 1155 an acknowledgment for establishing the call connection. If the first UE 1102 is the terminating UE, the call connection establishing module 1106 may send an acknowledgment to the second UE 1155 for establishing the call connection.

The bearer establishing module 1108 establishes at least one first dedicated bearer between the first UE and a network 1150 for communicating media packets with the second UE 1155. Establishing the at least one first dedicated bearer comprises setting up a quality of service (QoS) flow with QoS parameters comprising a maximum bit rate (MBR) and a guaranteed bit rate (GBR). The media packets may be exchanged between the first UE 1102 and the second UE 1155 via the QoS flow.

The data processing module 1110 sends first dummy data to the second UE 1155 via the established at least one first dedicated bearer. The first dummy data may be periodically sent to the second UE 1155 until at least one of second dummy data or a media packet is received from the second UE 1155. The sending the first dummy data to the second UE 1155 indicates to the second UE 1155 that the at least one first dedicated bearer is established between the first UE 1102 and the network 1150 for communicating media packets with the second UE 1155.

The data processing module 1110 receives the at least one of the second dummy data or the media packet from the second UE 1155 via the established at least one first dedicated bearer. Here, receiving the at least one of the second dummy data or the media packet from the second UE 1155 indicates that at least one second dedicated bearer is established between the second UE and the network 1150 for communicating media packets with the first UE 1102. Moreover, the establishment of the at least one second dedicated bearer indicates that a quality of service (QoS) flow with QoS parameters comprising at least a maximum bit rate (MBR) and a guaranteed bit rate (GBR) is set up at the second UE 1155.

The data processing module 1110 exchanges media packets with the second UE 1155 via the established at least one first dedicated bearer after receiving the at least one of the second dummy data or the media packet from the second UE 1155. The call connection establishing module 1106 informs a user interface at the first UE 1102 that the call connection is established after the at least one first dedicated bearer is established and the at least one of the second dummy data or the media packet from the second UE 1155 is received.

In a further aspect, the bearer establishing module 1108 establishes a dedicated bearer between the first UE 1102 and a first base station 1150 for a call connection with a second UE 1155. Establishing the dedicated bearer includes receiving a maximum bit rate (MBR) and a guaranteed bit rate (GBR) for the call connection, wherein the first base station is capable of supporting the MBR. The bit rate processing module 1112, receives an indication that congestion is experienced either at the first base station 1150 or a second base station if a handover is performed from the first base station 1150 to the second base station. Accordingly, the bit rate processing module 1112 sends a temporary maximum media bit rate request (TMMBR) to the second UE 1155 for lowering a bit rate for the call connection to the GBR. The TMMBR may be repeatedly sent to the second UE 1155 until the second UE 1155 lowers the bit rate to the GBR and the first base station 1150 or second base station stops sending the indication that congestion is experienced. After a configurable period of time from when the first base station 1150 or second base station stops sending the indication that congestion is experienced, the bit rate processing module sends a bit rate request to the second UE 1155 for increasing the bit rate for the call connection to the MBR.

In yet another aspect, the bearer establishing module 1108 establishes a dedicated bearer between the first UE 1102 and a base station 1150 for a call connection with a second UE 1155. Establishing the dedicated bearer includes receiving a maximum bit rate (MBR) and a guaranteed bit rate (GBR) for the call connection. The bit rate processing module 1112 receives from the base station 1150 a new MBR after the dedicated bearer has been modified. The new MBR is less than a current bit rate for the call connection. Accordingly, the bit rate processing module 1112 sends a temporary maximum media bit rate request (TMMBR) to the second UE 1155 for lowering a bit rate to continue the call connection according to the new MBR. If the new MBR is different from a current MBR, the call connection establishing module 1106 sends a request to the second UE 1155 to re-negotiate the call connection by providing a new data bandwidth.

The apparatus may include additional modules that perform each of the steps of the algorithm in the aforementioned flow charts of FIGS. 8-10. As such, each step in the aforementioned flow charts of FIGS. 8-10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
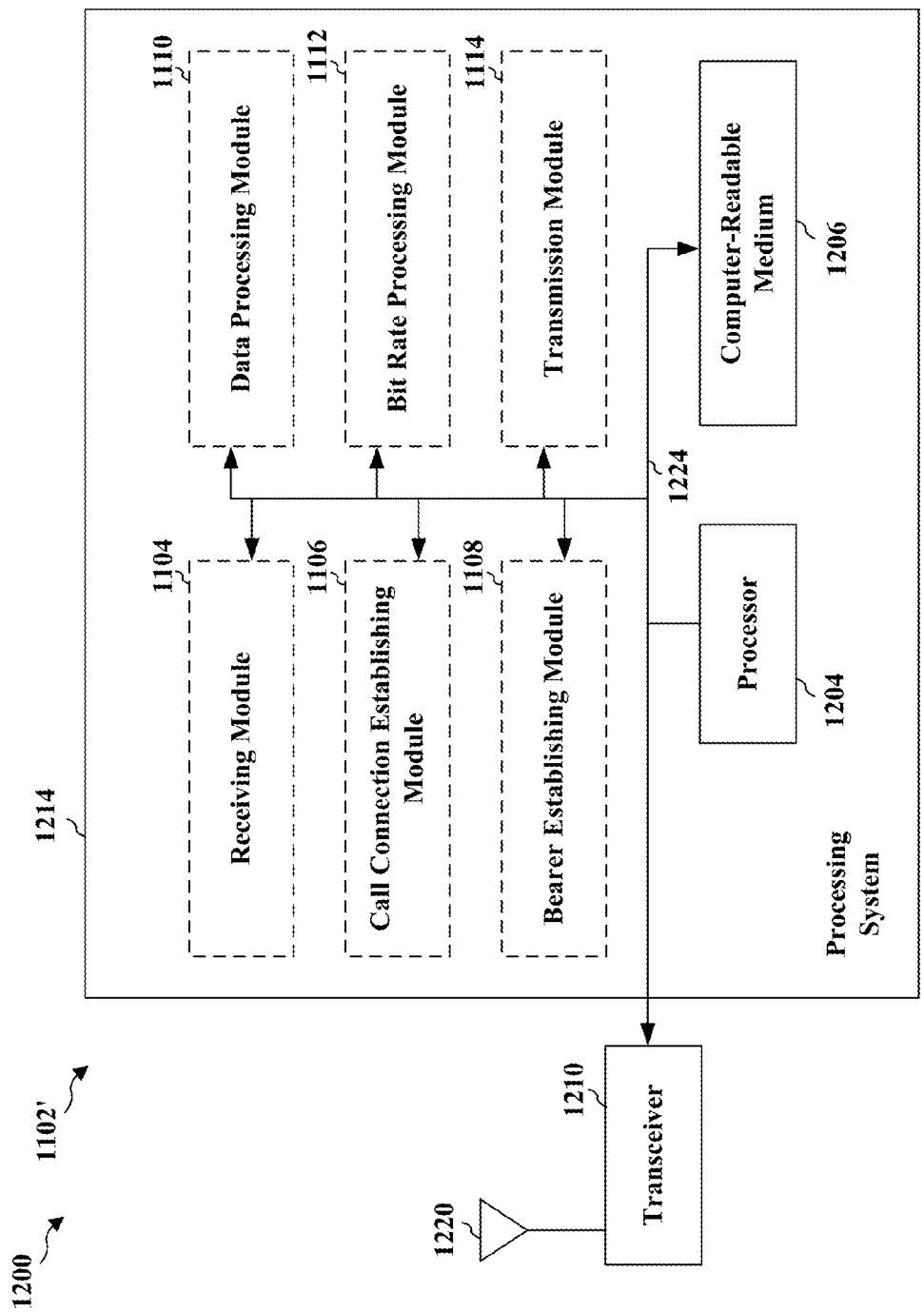
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1114, and based on the received information, generates a signal to be applied to the one or more antennas 1220. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, 1112, and 1114. The modules may be software modules running in the processor 1204, resident/stored in the computer readable medium 1206, one or more hardware modules coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for sending/receiving a request to/from a second UE for establishing a call connection, means for receiving/sending from/to the second UE an acknowledgment for establishing the call connection, means for establishing at least one first dedicated bearer between the first UE and a network for communicating media packets with the second UE, means for sending first dummy data to the second UE via the established at least one first dedicated bearer, means for receiving at least one of second dummy data or a media packet from the second UE via the established at least one first dedicated bearer, means for exchanging media packets with the second UE via the established at least one first dedicated bearer after receiving the at least one of the second dummy data or the media packet from the second UE, means for informing a user interface at the first UE that the call connection is established after the at least one first dedicated bearer is established and the at least one of the second dummy data or the media packet from the second UE is received, means for establishing a dedicated bearer between the first UE and a first base station for the call connection with the second UE, the establishing the dedicated bearer comprising receiving a maximum bit rate (MBR) and a guaranteed bit rate (GBR) for the call connection, the first base station capable of supporting the MBR, means for receiving an indication that congestion is experienced at one of the first base station or a second base station if a handover is performed from the first base station to the second base station, means for sending a temporary maximum media bit rate request (TMMBR) to the second UE for lowering a bit rate for the call connection to the GBR, means for sending a bit rate request to the second UE for increasing the bit rate for the call connection to the MBR, means for establishing a dedicated bearer between the first UE and a base station for the call connection with the second UE, the establishing the dedicated bearer comprising receiving a maximum bit rate (MBR) and a guaranteed bit rate (GBR) for the call connection, means for receiving from the base station a new MBR after the dedicated bearer has been modified, the new MBR less than a current bit rate for the call connection, means for sending a temporary maximum media bit rate request (TMMBR) to the second UE for lowering a bit rate to continue the call connection according to the new MBR, and means for sending a request to the second UE to re-negotiate the call connection by providing a new data bandwidth.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at an originating user equipment (UE), comprising:
   sending a request to a terminating UE for establishing a call connection;
   receiving from the terminating UE an acknowledgment for establishing the call connection;
   establishing at least one first dedicated bearer between the originating UE and a network for communicating media packets with the terminating UE;
   sending first dummy data to the terminating UE via the established at least one first dedicated bearer;
   receiving at least one of second dummy data or a media packet from the terminating UE via the established at least one first dedicated bearer, wherein the receiving the at least one of the second dummy data or the media packet from the terminating UE indicates that at least one second dedicated bearer is established between the terminating UE and the network for communicating media packets with the originating UE, and wherein the establishment of the at least one second dedicated bearer indicates that a quality of service (QoS) flow with QoS parameters is set up at the terminating UE; and
   exchanging media packets with the terminating UE via the established at least one first dedicated bearer after receiving the at least one of the second dummy data or the media packet from the terminating UE.

2. The method of claim 1, wherein the QoS parameters comprise at least a maximum bit rate (MBR) and a guaranteed bit rate (GBR).

3. The method of claim 1, wherein the first dummy data is periodically sent to the terminating UE until the at least one of the second dummy data or the media packet is received from the terminating UE.

4. The method of claim 1, wherein the establishing the at least one first dedicated bearer comprises setting up a quality of service (QoS) flow with QoS parameters comprising at least a maximum bit rate (MBR) and a guaranteed bit rate (GBR).

5. The method of claim 4, wherein the media packets are exchanged via the QoS flow.

6. The method of claim 1, wherein the sending the first dummy data to the terminating UE indicates to the terminating UE that the at least one first dedicated bearer is established between the originating UE and the network for communicating media packets with the terminating UE.

7. The method of claim 1, further comprising informing a user interface at the originating UE that the call connection is established after the at least one first dedicated bearer is established and the at least one of the second dummy data or the media packet from the terminating UE is received.

8. A method of wireless communication at a terminating user equipment (UE), comprising:
   receiving a request from an originating UE for establishing a call connection;
   sending to the originating UE an acknowledgment for establishing the call connection;
   establishing at least one first dedicated bearer between the terminating UE and a network for communicating media packets with the originating UE;
   sending first dummy data to the originating UE via the established at least one first dedicated bearer;
   receiving at least one of second dummy data or a media packet from the originating UE via the established at least one first dedicated bearer, wherein the receiving the at least one of the second dummy data or the media packet from the originating UE indicates that at least one second dedicated bearer is established between the originating UE and the network for communicating media packets with the terminating UE, and wherein the establishment of the at least one second dedicated bearer indicates that a quality of service (QoS) flow with QoS parameters is set up at the originating UE; and
   exchanging media packets with the originating UE via the established at least one first dedicated bearer after receiving the at least one of the second dummy data or the media packet from the originating UE.

9. The method of claim 8, wherein the establishing the at least one first dedicated bearer comprises setting up a quality of service (QoS) flow with QoS parameters comprising at least a maximum bit rate (MBR) and a guaranteed bit rate (GBR).

10. The method of claim 8, wherein the first dummy data is periodically sent to the originating UE until the at least one of the second dummy data or the media packet is received from the originating UE.

11. The method of claim 8, further comprising informing a user interface at the terminating UE that the call connection is established after the at least one first dedicated bearer is established and the at least one of the second dummy data or the media packet from the originating UE is received.

12. An apparatus for wireless communication at an originating user equipment (UE), comprising:
   a processing system configured to:
      send a request to a terminating UE for establishing a call connection;
      receive from the terminating UE an acknowledgment for establishing the call connection;
      establish at least one first dedicated bearer between the originating UE and a network for communicating media packets with the terminating UE;

send first dummy data to the terminating UE via the established at least one first dedicated bearer;

receive at least one of second dummy data or a media packet from the terminating UE via the established at least one first dedicated bearer, wherein the receiving the at least one of the second dummy data or the media packet from the terminating UE indicates that at least one second dedicated bearer is established between the terminating UE and the network for communicating media packets with the originating UE, and wherein the establishment of the at least one second dedicated bearer indicates that a quality of service (QoS) flow with QoS parameters is set up at the terminating UE; and exchange media packets with the terminating UE via the established at least one first dedicated bearer after receiving the at least one of the second dummy data or the media packet from the terminating UE.

13. The apparatus of claim 12, wherein the QoS parameters comprise at least a maximum bit rate (MBR) and a guaranteed bit rate (GBR).

14. The apparatus of claim 12, wherein the first dummy data is periodically sent to the terminating UE until the at least one of the second dummy data or the media packet is received from the terminating UE.

15. The apparatus of claim 12, wherein the processing system configured to establish the at least one first dedicated bearer is further configured to set up a quality of service (QoS) flow with QoS parameters comprising at least a maximum bit rate (MBR) and a guaranteed bit rate (GBR).

16. The apparatus of claim 15, wherein the media packets are exchanged via the QoS flow.

17. The apparatus of claim 12, wherein the sending the first dummy data to the terminating UE indicates to the terminating UE that the at least one first dedicated bearer is established between the originating UE and the network for communicating media packets with the terminating UE.

18. The apparatus of claim 12, the processing system further configured to inform a user interface at the originating UE that the call connection is established after the at least one first dedicated bearer is established and the at least one of the second dummy data or the media packet from the terminating UE is received.

19. An apparatus for wireless communication at a terminating user equipment (UE), comprising:
a processing system configured to:
receive a request from an originating UE for establishing a call connection;
send to the originating UE an acknowledgment for establishing the call connection;
establish at least one first dedicated bearer between the terminating UE and a network for communicating media packets with the originating UE;
send first dummy data to the originating UE via the established at least one first dedicated bearer;
receive at least one of second dummy data or a media packet from the originating UE via the established at least one first dedicated bearer, wherein the receiving the at least one of the second dummy data or the media packet from the originating UE indicates that at least one second dedicated bearer is established between the originating UE and the network for communicating media packets with the terminating UE, and wherein the establishment of the at least one second dedicated bearer indicates that a quality of service (QoS) flow with QoS parameters is set up at the originating UE; and
exchange media packets with the originating UE via the established at least one first dedicated bearer after receiving the at least one of the second dummy data or the media packet from the originating UE.

20. The apparatus of claim 19, wherein the processing system configured to establish the at least one first dedicated bearer is further configured to set up a quality of service (QoS) flow with QoS parameters comprising at least a maximum bit rate (MBR) and a guaranteed bit rate (GBR).

21. The apparatus of claim 19, wherein the first dummy data is periodically sent to the originating UE until the at least one of the second dummy data or the media packet is received from the originating UE.

22. The apparatus of claim 19, the processing system further configured to inform a user interface at the terminating UE that the call connection is established after the at least one first dedicated bearer is established and the at least one of the second dummy data or the media packet from the originating UE is received.

23. A computer program product at an originating user equipment (UE), comprising:
a non-transitory computer-readable medium comprising code for:
sending a request to a terminating UE for establishing a call connection;
receiving from the terminating UE an acknowledgment for establishing the call connection;
establishing at least one first dedicated bearer between the originating UE and a network for communicating media packets with the terminating UE;
sending first dummy data to the terminating UE via the established at least one first dedicated bearer;
receiving at least one of second dummy data or a media packet from the terminating UE via the established at least one first dedicated bearer, wherein the receiving the at least one of the second dummy data or the media packet from the terminating UE indicates that at least one second dedicated bearer is established between the terminating UE and the network for communicating media packets with the originating UE, and wherein the establishment of the at least one second dedicated bearer indicates that a quality of service (QoS) flow with QoS parameters is set up at the terminating UE; and
exchanging media packets with the terminating UE via the established at least one first dedicated bearer after receiving the at least one of the second dummy data or the media packet from the terminating UE.

24. The computer program product of claim 23, wherein the QoS parameters comprise at least a maximum bit rate (MBR) and a guaranteed bit rate (GBR).

25. The computer program product of claim 23, wherein the first dummy data is periodically sent to the terminating UE until the at least one of the second dummy data or the media packet is received from the terminating UE.

26. The computer program product of claim 23, wherein the establishing the at least one first dedicated bearer comprises setting up a quality of service (QoS) flow with QoS parameters comprising at least a maximum bit rate (MBR) and a guaranteed bit rate (GBR).

27. The computer program product of claim 26, wherein the media packets are exchanged via the QoS flow.

28. The computer program product of claim 23, wherein the sending the first dummy data to the terminating UE indicates to the terminating UE that the at least one first dedicated bearer is established between the originating UE and the network for communicating media packets with the terminating UE.

29. The computer program product of claim 23, the non-transitory computer-readable medium further comprising code for informing a user interface at the originating UE that the call connection is established after the at least one first dedicated bearer is established and the at least one of the second dummy data or the media packet from the terminating UE is received.

30. A computer program product at a terminating user equipment (UE), comprising:
a non-transitory computer-readable medium comprising code for:
receiving a request from an originating UE for establishing a call connection;
sending to the originating UE an acknowledgment for establishing the call connection;
establishing at least one first dedicated bearer between the terminating UE and a network for communicating media packets with the originating UE;
sending first dummy data to the originating UE via the established at least one first dedicated bearer;
receiving at least one of second dummy data or a media packet from the originating UE via the established at least one first dedicated bearer, wherein the receiving the at least one of the second dummy data or the media packet from the originating UE indicates that at least one second dedicated bearer is established between the originating UE and the network for communicating media packets with the terminating UE, and wherein the establishment of the at least one second dedicated bearer indicates that a quality of service (QoS) flow with QoS parameters is set up at the originating UE; and
exchanging media packets with the originating UE via the established at least one first dedicated bearer after receiving the at least one of the second dummy data or the media packet from the originating UE.

31. The computer program product of claim 30, wherein the establishing the at least one first dedicated bearer comprises setting up a quality of service (QoS) flow with QoS parameters comprising at least a maximum bit rate (MBR) and a guaranteed bit rate (GBR).

32. The computer program product of claim 30, wherein the first dummy data is periodically sent to the originating UE until the at least one of the second dummy data or the media packet is received from the originating UE.

33. The computer program product of claim 30, the non-transitory computer-readable medium further comprising code for informing a user interface at the terminating UE that the call connection is established after the at least one first dedicated bearer is established and the at least one of the second dummy data or the media packet from the originating UE is received.

* * * * *